United States Patent [19]

Buechler

[11] Patent Number: 4,500,929
[45] Date of Patent: * Feb. 19, 1985

[54] METHOD OF ENGRAVING AN INVISIBLE JOINT WITHIN A GRAVURE PRINTING CYLINDER

[76] Inventor: Lester W. Buechler, 3193 Plainfield Rd., Dayton, Ohio 45432

[*] Notice: The portion of the term of this patent subsequent to May 20, 2001 has been disclaimed.

[21] Appl. No.: 294,224

[22] Filed: Aug. 19, 1981

Related U.S. Application Data

[63] Continuation-in-part of Ser. No. 056,623, Jul. 11, 1979, Pat. No. 4,357,633.

[51] Int. Cl.³ .............................................. H04N 1/24
[52] U.S. Cl. ...................................... 358/299; 101/1; 101/DIG. 2
[58] Field of Search ............................... 358/296–299, 358/256, 280, 283, 289; 101/DIG. 2, 1

[56] References Cited

U.S. PATENT DOCUMENTS

| | | | |
|---|---|---|---|
| 2,160,951 | 6/1939 | Alice | 358/297 |
| 3,760,098 | 9/1973 | de Voss et al. | 358/283 |
| 3,848,083 | 11/1974 | Townsend | 358/256 |
| 3,904,816 | 9/1975 | Taudt et al. | 358/256 |
| 4,232,345 | 11/1980 | Zollman et al. | 358/299 |

Primary Examiner—Raymond F. Cardillo, Jr.
Attorney, Agent, or Firm—Jacox & Meckstroth

[57] ABSTRACT

A gravure printing cylinder is engraved with a pattern, such as a woodgrain pattern, by sensing and comparing the copy density at opposite ends of the pattern and then engraving the pattern with a correction for the unbalance in the copy density to produce a joint which is less visible to the human eye. A less visible joint is also formed by engraving the starting cells for the pattern at circumferentially spaced locations on the cylinder to produce either a non-linear interwoven joint and/or an irregular zig-zag joint.

5 Claims, 6 Drawing Figures

METHOD OF ENGRAVING AN INVISIBLE JOINT WITHIN A GRAVURE PRINTING CYLINDER

RELATED APPLICATION

This application is a continuation-in-part of application Ser. No. 056,623, filed July 11, 1979, now U.S. Pat. No. 4,357,633. The disclosure of U.S. Pat. No. 4,357,633 is incorporated herein by reference.

BACKGROUND OF THE INVENTION

This invention relates to the engraving of cylinders commonly used in the gravure printing process, and specifically to engraving apparatus of the general type disclosed, for example, in U.S. Pat. Nos. 2,881,246, 2,874,479, 3,272,918, and 4,013,829. The basic principle of electro-mechanical engraving of a gravure cylinder involves rotating a copper plated cylinder while actuating an electrically driven tool which cuts or engraves cells or lines into the copper surface. The engraved cylinder is normally used in a web type gravure printing press for printing paper, plastic, or metallic film material.

In the gravure printing process, the engraved cylinder is flooded with ink, and a doctor blade wipes off excess ink from the surface so that only the engraved cells contain ink which is transferred to the material being printed. To obtain a high quality print, it is necessary that the cells be very accurately placed or located on the cylinder surface, usually within one to two microns of the desired theoretical location. The depth of the engraved cells must also be accurately controlled since the depth determines the amount of ink transferred which, in turn, determines the shade of gray in a black-white print. In a color print, the amount of ink transferred to the paper or material is even more critical since three colors are mixed to produce various shades of all possible colors. A slight variation in the desired amount of ink effects not only the darkness of the color but, more importantly, the production of the desired color tone.

In addition to printing newspapers and magazines, the engraved cylinders may also be used for direct or indirect printing of cloth, applying glue, printing of packaging materials for products, and printing of wood grain patterns for making wall paneling, floor coverings and other surface covers. A preferred apparatus for engraving a gravure printing cylinder is disclosed in pending U.S. patent application Ser. No. 056,623, filed July 11, 1979, now U.S. Pat. No. 4,357,633.

In the engraving of a gravure cylinder, the image pattern or copy to be engraved is usually mounted on a copy cylinder, and the copy is optically scanned while the engraving is being performed. However, the copy may be scanned and the corresponding information stored in computer memory, processed, and later used to engrave a cylinder. The engraving machine may be an electro-mechanical engraver which uses a diamond stylus to engrave the cylinder, or the machine may incorporate electronic means such as electron beam or laser for forming the cells within the cylinder. In either machine, a series of cavities and/or lines are engraved into the cylinder surface. The cavities are adapted to carry ink which produces the image on the material being printed. The image may involve either very small images such as printing type requiring very small and well defined lines or pictures requiring very close control of different cylinders for different colored inks needed for close color matching or large images for printing items such as wallpaper.

In the making of engraved cylinders for printing woodgrains, wall paper, and other printed patterns, there are various problems which in the past have been overcome by the use of a considerable amount of hand work, both in making the copy and in rework of the engraved cylinders. One of the problems is the need for large copy. Typically, a copy will range in size, for example, up to 60 inches by 60 inches, or even larger. With large copies, even with photographically produced copies, it is almost impossible to obtain a copy which has uniform density from end to end. When the two ends are joined on the engraved cylinder, the discontinuity in the film density shows up across the joint. A straight line joint in the copy is easier to recognize by the eye than a joint which is broken up, even by a small amount.

In the past, the copy for patterns such as woodgrains have been made by handworking a joint in the middle of the copy so that the ends have a repeat of patterns. It is then possible, with proper care for film density, to make the engraved joint directly across the copy. Usually there is a sizeable area of repeat in which the engraved joint can be made. The making of the hand made joint in the copy is very costly. It is usually made in a zig-zag manner extending for 6 to 12 inches or more. The exact path of the zig-zag is chosen to follow the woodgrains or across areas of similar woodgrains. Balance for film density is necessary, and larger grains of wood must be blended to make an invisible joint. Elimination of this hand made joint is highly desirable.

SUMMARY OF THE INVENTION

The present invention is directed to improved method and apparatus for electro-mechanically engraving printing plates or cylinders and which effectively solves the above-mentioned problems in the electro-mechanical engraving of gravure printing cylinders for printing woodgrains, wall paper and other printed patterns. Preferably, the method involves producing an interwoven joint on the engraved cylinder to break up a straight line joint and/or the uses of balance correction for unbalances across the joint in order to make the joint less visible. Such joints normally involve copy which has a repeat pattern or where any required blending has been done manually. The process of the invention also provides for producing a zig-zag joint judiciously chosen to eliminate the need of a hand made joint. In this method, the zig-zag is made to follow areas where it will be least detectable. The use of balance correction and/or interwoven joint and/or a zig-zag joint provide for engraving cylinders without a hand worked joint.

Other features and advantages of the invention will be apparent from the following description, the accompanying drawings and the appended claims.

DESCRIPTION OF THE PREFERRED EMBODIMENTS

Figure 1:
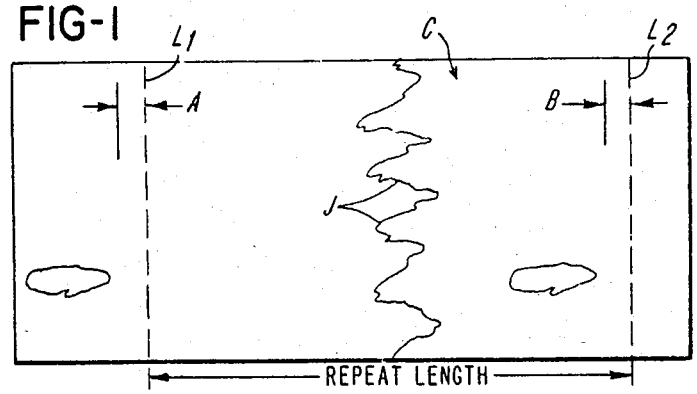
FIG. 1 illustrates a typical copy having a repeat wood grain pattern and showing a typical joint within the pattern.
Figure 2:
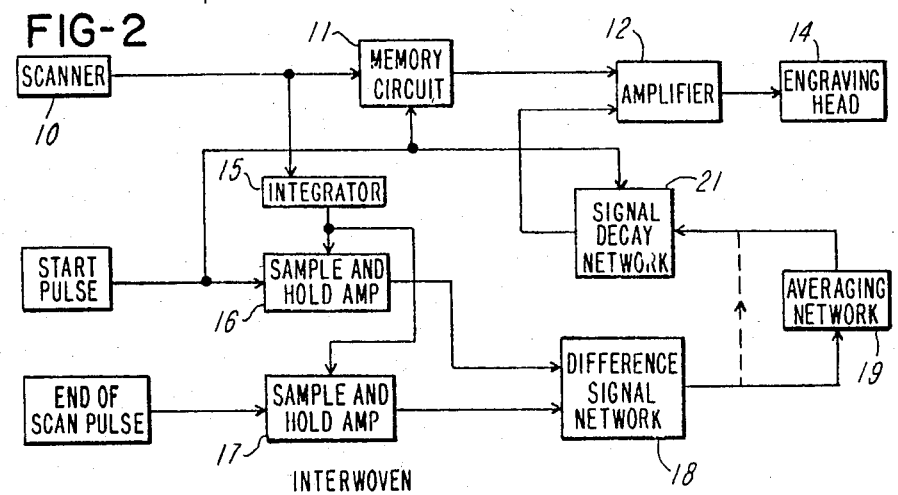
FIG. 2 is a block diagram illustrating the control circuit for an engraving head in order to correct for film balance and produce a substantially invisible joint on the engraved cylinder from the copy shown in FIG. 1.

In reference to FIG. 1, the engraving of repeat patterns on a gravure cylinder usually requires the copy to be made so that it is longer than one repeat length. The copy C illustrated in FIG. 1, usually a photographic copy, is mounted on a copy cylinder with the length of the copy extending circumferentially. The copy has a joint J which has been manually made to be as invisible as possible. It is desired to engrave the image by scanning from reference line L1 to reference line L2 circumferentially around the copy cylinder and then engraving the gravure cylinder in a similar manner such that an invisible joint is made between superimposed reference lines L1 and L2. Usually, there is a gray scale shift due to the photographic process which makes the copy in the area of line L1 darker or lighter than the copy in the area of line L2. Thus when placed next to each other on the engraved cylinder, the joint of lines L1 and L2 becomes very visible and it is expensive to correct this problem manually after engraving. This problem is effectively corrected by the control system illustrated in FIG. 2. The scanner 10 scans the entire length of the copy C shown in FIG. 1 from the left end to the right end of the copy as the copy is rotated in the direction of the "Repeat Length" on the copy support or scanner cylinder. The memory circuit 11 remembers at least one signal pick-up scan line from reference line L1 to line L2 and supplies a signal to the amplifier 12 for driving the starts at reference engraver head 14 so that the line L1 are engraved next to the ends at reference line L2.

The scanner 10 signal is also fed into an integrator 15, such as an R-C network, which samples a portion of the line such as the scan length A which may be from ¼ inch to 1 inch. A start pulse operates to start the memory circuit 11 and to start the engraving cycle and cause the sample and hold amplifier 16 to sample the scan line length A. At the end of the copy scanned at reference line L2, a separate signal or end of scan pulse causes a second sample length B of the scan line to be sampled by the sample and hold amplifier. 17. Any difference between the two sample signals is fed from a difference signal network 18 through an averaging network 19 to a signal decay network 21, such as a C-R network or fast decay sample and hold amplifier. When a start pulse is received by this network, it sends a signal to the amplifier 12 which causes the reading from the area of reference line L1 on the copy to be increased or decreased to match the signal from the area of reference line L2 on the copy. Thus the engraving depth for cells just after L1 and just before L2 are made to match or be corrected for any difference in copy density.

The signal from the signal decay network 18 decreases as the engraving proceeds from reference line L1 to reference line L2 in a gradual manner so that it is not apparent on the engraved surface on the printing cylinder. The gray scale shift from line L1 to line L2 on the copy is normally a large area phenomena. If full correction is taken on a line-by-line basis, there may be too much or too little correction taken which is due to the details in the copy. In such a case, it is desirable to use the averaging network 19 which averages several differential signals over several engraved lines, providing a more accurate area correction for gray scale errors.

It may be desirable for the engraver to operate so that the timing for its engraving start (for reference line L1) is not the same as the start of the scan, the start pulse for the signal decay network would then be the start of the engrave signal. It is apparent that in this case, an engraving start pickup separate from the scanner may be used in this system. In addition, the exact location of the pickup signal may be varied as long as the pick up is representative of differences of intensity of gray in the areas of the two lines to be joined.

Figure 3:
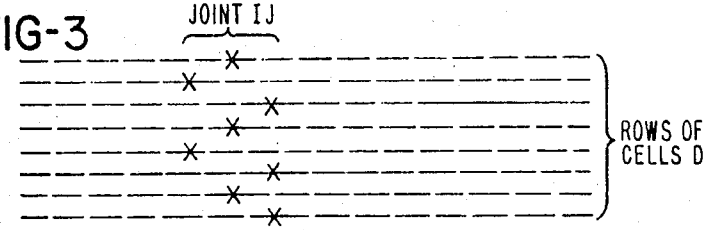
FIG. 3 illustrates rows of engraved cells within a cylinder surface and having an interwoven joint made in accordance with the invention.

The above method of correcting for the gross density difference across the joint is also disclosed in above mentioned U.S. Pat. No. 4,357,633. The resultant correction produces a generally straight line joint across the lines of engraved cells D (FIG. 3). While such gross correction is made across the joint for film unbalance, it is very difficult to correct exactly for all shades of gray particularly when there is a pattern such as found in woodgrain engravings. A person's eye is a very good detector and can recognize minor faults in the pattern, especially if the faults are in a straight line joint.

It has been found that if the straight line joint is broken up such as by a staggered or interwoven joint 1J as illustrated in FIG. 3, a person's eye does not recognize the joint readily and a much better appearing product results. When using the combination of balance correction described above in connection with FIGS. 1 and 2 with an interwoven joint 1J as shown in FIG. 3, it is possible on almost all engraved cylinders to go directly from engraving to printing with no handwork. This is accomplished by recording data in memory in each circumferentially scanned line after reference line L2 in FIG. 1. The start pulse (FIG. 2) is delayed a small amount such as ¼" to ¾" in a varying pattern. Extra memory recorded after reference line L2 is engraved in place of beginning engraving at reference line L1, until the delayed pulse is received.

A major cost area in producing a woodgrain engraved cylinder is the cost of preparing the copy with a repeat pattern. As mentioned above, a hand-worked joint in the copy is normally made so that there is a repeat pattern appearing on each end. Making this hand-worked joint in the copy on a typical large copy may cost 50 to 200 hours of hand work. The hand-worked joint must be blended into the woodgrains, around knots, and tones of wood until the eye cannot recognize that a joint has been made.

Figure 5:
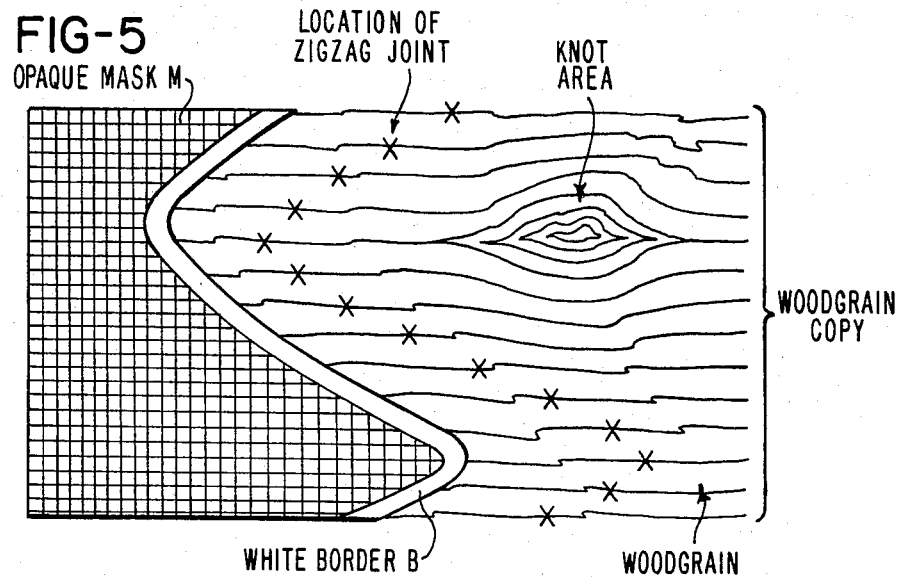
FIGS. 5 and 6 are illustrations showing the production of a zig-zag interwoven joint with balance correction in the engraved rows of cells on a printing cylinder.
Figure 6:
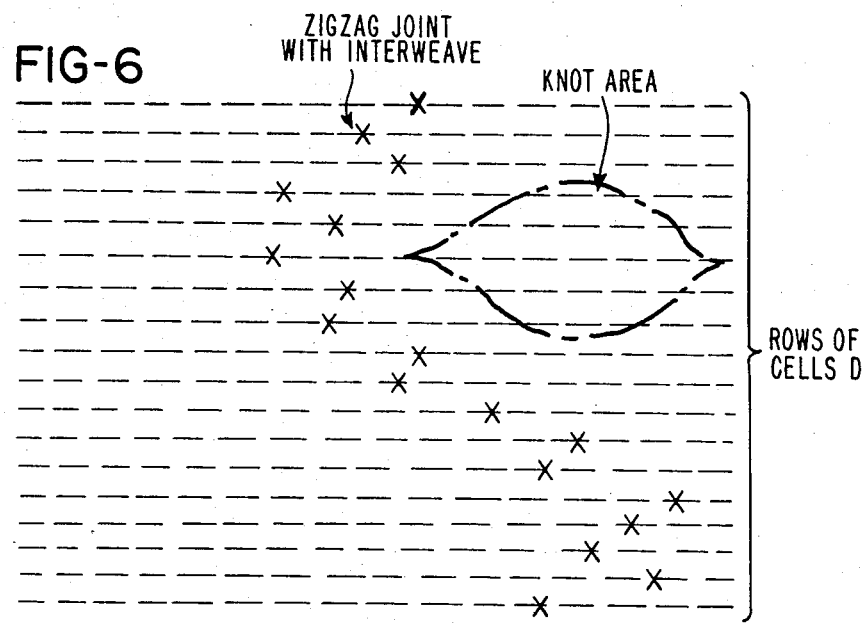

It has been found possible to select an area for the joint, such as done in a hand-made joint, and then use an opaque mask M (FIG. 5) or programming the joint line into the computor memory. As illustrated in FIG. 5, a selected joint 1J will typically follow a grain pattern around knots and in a generally irregular zig-zag pattern so as to make the most natural joint based on the woodgrain copy being used. Again, there are the problems of density unbalance across the joint and of making a line joint which the eye cannot detect. The correction for unbalance is accomplished in a manner as described above in connection with FIGS. 1 and 2. However, the measurement of the film density is made along the area of the zig-zag start rather than along and across a straight line joint. While the irregular or zig-zag start makes the joint less easy to recognize by the eye, the difference in character across the joint may be recognizable. Thus the use of the interweave across the joint as shown in FIG. 5 has been found to help greatly in blending across the joint and making a joint equivalent to a handmade joint.

Figure 4:
FIG. 4 is a block diagram illustrating the random time delay control circuit for starting the engraving of each line of cells around the cylinder for use in producing an interwoven joint.

The production of an interwoven joint 1J if accomplished in the following manner. In the engraving system, both on the copy and in a memory system, there is information available for the total area to be engraved and for a distance either before and/or after the area to be engraved. A signal in the engraving system normally starts the engraving at the engraving joint line, that is, where reference line L2 joins reference line L1. A line is then engraved around the cylinder to the joint line where the next line is started. A random time delay is introduced in the start pulse as illustrated in FIG. 4 so that the line being engraved is continued for a distance beyond the normal start line and at the delayed point, a new engraving line is started. It has been found that a distance of 0 inches to 1 inch is useable, however, a random distance of 0 to ⅜ inch accomplishes the desired result of avoiding the eye recognizing the joint. The random time delay can be produced in a number of ways. For example, a preprogrammed generator may generate delays of various lengths of time on either a repetitive basis or on a random basis as long as the purpose of breaking up the straight line joint is accomplished. The random time delay may also be obtained by using a program such as in a computer with a read-out memory (ROM) to generate the desired irregular start of the interwoven joint.

The interwoven joint is normally used with the balance correction. For best results, the measurement of film density, or the density in the computer memory, should be taken adjacent to the particular start points used especially if the interwoven joint extends for ½ inch or more. This is accomplished by using the delayed start pulse to initiate the sampling of film density as described above.

The purpose and use of the zig-zag start is quite different than the interweave start. The purpose of the zig-zag start is to establish a joint in the pattern in such a manner that the machine will make the equivalent of the hand-made joint in an invisible manner. A joint line is chosen where there is best probability of making an invisible joint. In one version of the invention, a black mask M with a white border B is used to outline the shape of the irregular start line wanted. The scanner is then used as a detector. When a dark to light transfer is seen by the scanner after a normal start pulse, a time delay is initiated. At some point (possibly ½ inch to 2 inches), a start engraving pulse is sent to the engraving system. The delay function is to be certain the scanner is well past the black-white border B of the mask M and to allow film densities to be compared in the balance correction circuits. Of course, it is apparent that the desired zig-zag start line can be inserted into a computer memory such as a ROM so that when the engraving is underway, the start points can be computer generated for the zig-zag start line to control the start of engraving. This would be especially desirable if the engraving information has been prescanned and placed into memory as is often done with modern scanners and memory storage units.

The zig-zag start feature is preferably used with a balance correction and an interwoven joint, as previously discussed, to minimize the possibility that the eye can recognize where the joint was made. However, the zig-zag start can be used with or without the interweave in making joints in normal copy instead of straight line joints especially if there is a bad unbalance on a copy pattern which the zig-zag start feature will assist in obscuring.

While the methods and forms of apparatus herein described constitute preferred embodiments of the invention, it is to be understood that the invention is not limited to the precise methods and forms of apparatus described, and that changes may be made therein without departing from the scope and spirit of the invention as defined in the appended claims.

The invention having thus been described, the following is claimed:

1. A method of engraving the surface of a gravure printing cylinder with a pattern adapted to be repetitively printed with a joint between adjacent printed patterns being less visible to the human eye, comprising the steps of scanning a copy of a pattern having selected opposite ends adapted to form a joint on the gravure printing cylinder, electronically sensing the copy density at two locations on the pattern copy adjacent the opposite ends, electronically comparing the density at the different locations, electronically determining a correction factor based upon the comparison, engraving generally circumferentially extending rows of peripherally spaced cells within the cylinder surface according to the pattern, and adjusting the depth of the engraved cells corresponding to the opposite ends of the copy according to the correction factor to correct for unbalance in copy density at the two locations on the pattern copy.

2. A method as defined in claim 1 wherein the step of engraving the circumferentially extending rows of peripherally spaced cells comprise starting the engraving of cells in certain rows of cells circumferentially spaced in opposite circumferential directions with respect to the starting of engraving of cells in the adjacent rows of cells for producing a nonlinear interwoven or zig-zag joint across the rows of cells forming the pattern on the cylinder surface.

3. A method of engraving the surface of a gravure printing cylinder with a pattern adapted to be repetitively printed with a joint between adjacent printed patterns being less visible to the human eye, comprising the steps of scanning a copy of a pattern having selected opposite ends adapted to form a joint on the gravure printing cylinder, engraving axially spaced and generally circumferentially extending rows of peripherally spaced cells within the surface of the printing cylinder to form the engraved pattern, and starting the engraving of cells in certain rows of cells circumferentially spaced in opposite circumferential directions with respect to the starting of engraving of cells in the adjacent rows of cells for producing a nonlinear interwoven or zig-zag joint across the rows of cells forming the pattern on the cylinder surface.

4. A method as defined in claim 1 or 3 and including the step of selecting a generally zig-zag line to form the opposite ends of the pattern on the copy, and starting the engraving for the opposite ends of the pattern within the cylinder surface along the zig-zag line to form an irregular zig-zag joint.

5. A method of engraving the surface of a gravure printing cylinder with a pattern adapted to be repetitively printed with a joint between adjacent printed patterns being less visible to the human eye, comprising the steps of obtaining a copy of a pattern having selected opposite ends adapted to form a joint on the gravure printing cylinder, placing on the copy a mask defining a zig-zag line at one end of the pattern, scanning the copy with the mask thereon and obtaining information corresponding to the pattern, using the information and engraving axially spaced and generally circumferentially extending rows of peripherally spaced cells within the surface of the printing cylinder to form the engraved pattern, and starting the engraving of cells along the zig-zag line generally defined by the mask to start certain rows of cells circumferentially spaced in opposite circumferential directions with respect to the starting of engraving of cells in the adjacent rows of cells for producing a non-linear zig-zag joint across the rows of cells forming the pattern on the cylinder surface.

* * * * *